Figure 1:
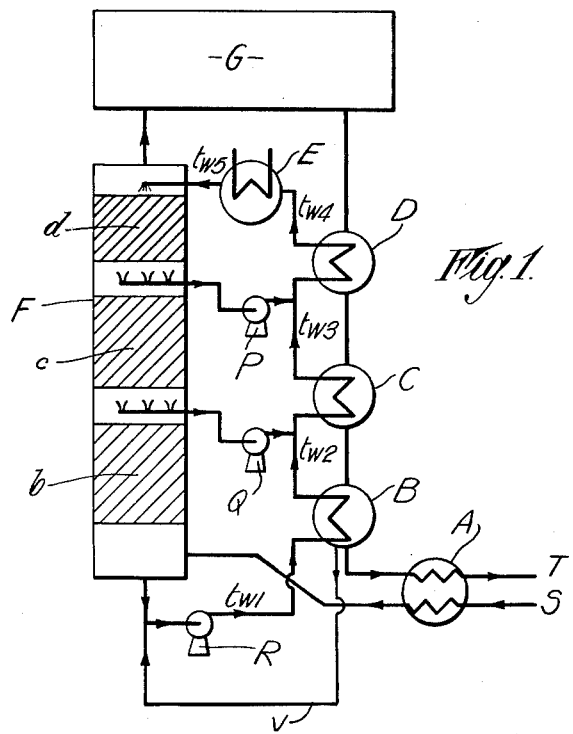

Feb. 6, 1962           H. R. C. PRATT           3,019,610

GAS HUMIDIFICATION AND DE-HUMIDIFICATION PROCESSES

Filed Nov. 6, 1957           2 Sheets-Sheet 1

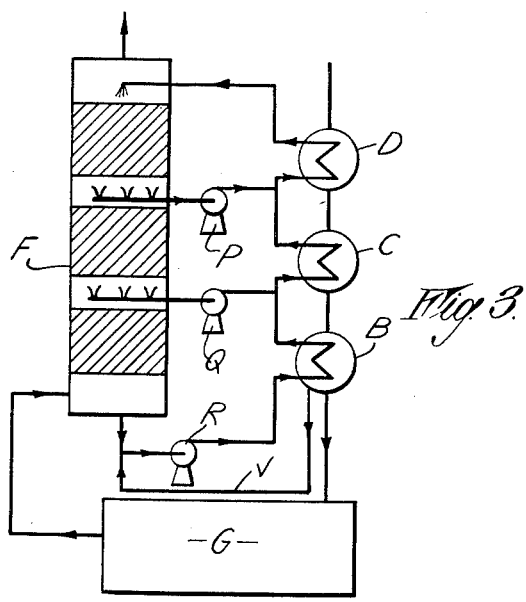
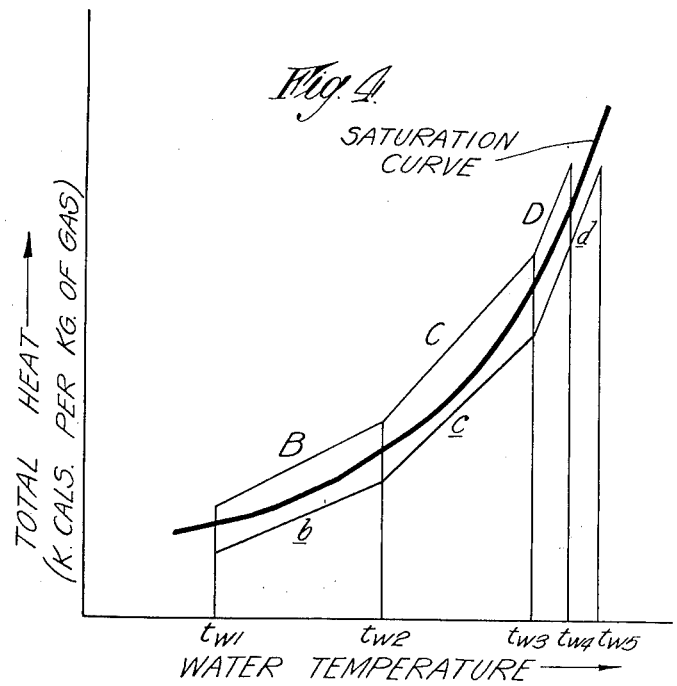

United States Patent Office 3,019,610
Patented Feb. 6, 1962

3,019,610
GAS HUMIDIFICATION AND DE-HUMIDIFICATION PROCESSES
Henry Reginald Clive Pratt, Abingdon, England, assignor to The United Kingdom Atomic Energy Authority, The Patents Branch, London, England
Filed Nov. 6, 1957, Ser. No. 694,821
Claims priority, application Great Britain Nov. 9, 1956
8 Claims. (Cl. 62—11)

The invention relates to gas humidification and dehumidification processes.

The term humidification includes partial or complete saturation of any gas with any other gas or vapour, and the term dehumidification includes partial or complete desaturation of any gas from any other gas or vapour. In particular the other gas or vapour may be water vapour.

Processes involving the chemical treatment of a humid gas stream and the subsequent dehumidification of the product are well known. The heat recovery from the humidification and dehumidification processes is generally low, as the operating lines for the humidification and the dehumidification stages, respectively, on a gas total heat-humidifying liquid heat content diagram must be widely spaced if they are not to intersect the saturation curve.

It is an object of the present invention to improve the efficiency of the heat recovery from such systems.

According to the present invention, in the combination of a gas humidification process and a gas dehumidification process, each of said processes comprises at least two successive stages, the relation between the total heat content of the humidified gas and the heat content of the humidifying liquid in each of said stages being arranged such that the operation lines in a diagram representing said relation graphically more nearly approximate the saturation curve without intersecting said saturation curve, than would a single operating line, heat being transferred between reciprocal stages of said processes.

The total heat of the gas is the heat content of the humidified gas per unit weight of dry gas. The heat content of the humidifying liquid is the product of its specific heat ($C_p$) and its absolute temperature. When the humidifying liquid is water, this is numerically equal to the water temperature.

The gas humidification process may be performed in a humidification tower operated in sections in which the liquid rates (liquid-gas ratios) increase successively in each section through which the gas (successively) passes from bottom to top of the tower.

The gas dehumidification process may be performed in a similar sectioned dehumidification tower in which the liquid rates decrease in successive sections from bottom to top of the tower, heat being exchanged between reciprocal sections of the two towers, i.e. the top section of the humidification tower is in heat exchange relationship with the bottom section of the dehumidification tower and so on.

In a process in which there is no need to keep the liquid in the humidification tower separate from the liquid in the dehumidification tower, part of the liquid is transferred directly from sections of the humidification tower to reciprocal sections of the dehumidification tower.

If, however, it is essential to keep said liquids separate, e.g. when there are differences in the isotopic compositions of the liquids and it is desired to maintain such differences to yield a product enriched in particular isotopes, then heat exchangers are employed between the reciprocal sections of the towers. Alternatively, the dehumidification tower and the heat exchangers may be replaced in such a process by surface heat exchangers operating as cooler condensers.

Figure 2:
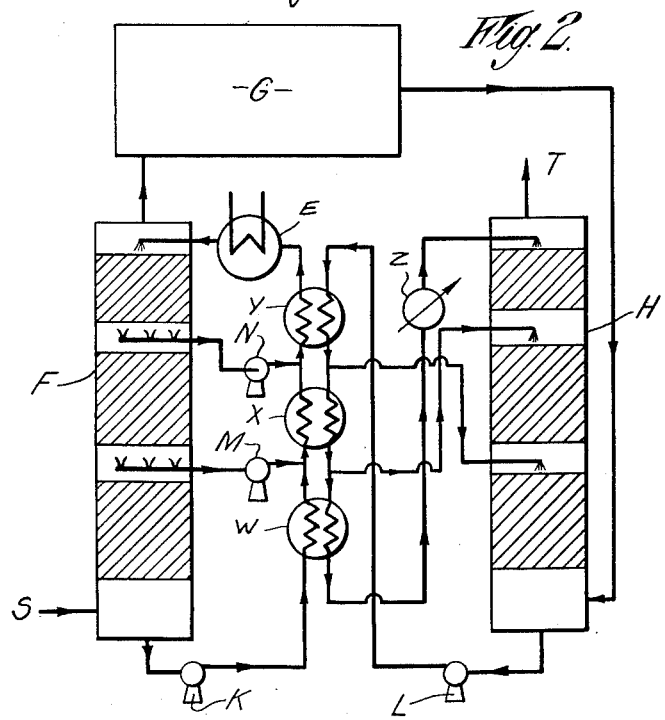

Embodiments of the invention will now be explained by way of example with reference to the accompanying drawings in which:

FIG. 1 diagrammatically shows a process for feeding a humidified chemical process using cooler condensers, FIG. 2 diagrammatically shows a process for feeding a similar chemical process using a dehumidification tower, FIG. 3 diagrammatically shows a process for feeding a dehumidified chemical process, using cooler condensers, and FIG. 4 is a gas total heat-water temperature diagram for a process as illustrated in FIG. 1.

In FIG. 1, a feed gas S at low temperature is heated and humidified in tower F before taking part in a chemical action in the reactor G. The humid processed gas is returned to a series of cooler condensers, D, C and B and finally cooled in heat exchanger A and drawn off at T. Water is circulated by pump R from the base of the tower F through the cooler condensers B, C and D and through a heater E before being sprayed in at the top of tower F. Alternatively, the heater E may be dispensed with and extra steam may be injected at the same point in the water stream. Tower F is divided into sections $b$, $c$ and $d$ and further quantities of water are circulated between points between sections $b$, $c$, $d$ in the tower F and corresponding points between condensers B, C, D. Thus section $b$ is associated with condenser B, section $c$ with condenser C, and section $d$ with condenser D, the circulation being by means of pump P between sections $c$, $d$ and condensers C, D and pump Q between sections $b$, $c$ and condensers B, C. The liquid rate is thus varied over the various sections of the tower. The condensate from cooler condensers D, C and B drains into B where a drain pipe V returns it to pump R for recirculation.

The water temperatures $t_{w1}$, $t_{w2}$, $t_{w3}$, $t_{w4}$, $t_{w5}$ at various points in the system may be plotted against gas total heat (expressed per unit weight of dry gas) on a diagram on which the saturation curve is also drawn (FIG. 4).

Operating lines with slopes equal to the liquid-gas ratio are drawn beneath the saturation curve for the humidification tower and above the saturation curve for the cooler condensers. It is seen that the series of operating lines approximate to the saturation curve, and the degree of approximation is determined by the number of stages taken.

FIG. 2 shows a similar process to FIG. 1 where gas is fed to the system at S, takes part in a chemical action in reactor G and the treated gas discharged at T, but in which the cooler condensers have been replaced by a dehumidification tower H and a series of water-water heat exchangers W, X, Y. Towers F and H are again arranged in sections, and pumps N and M circulate quantities of water between selected points in the towers and points between heat exchangers W, X, Y. The water fed to the top of tower F is circulated by pump K and is heated by heater E, as in FIGURE 1, and pump L and cooler E perform the necessary corresponding functions in tower H. Alternatively, the heater E may be dispensed with and extra steam injected at the same point in the water stream. Water from the top section of tower F is passed into heat-exchange relationship with water returning to the bottom section of tower H in heat exchanger Y; water from the middle section of tower F is passed into heat-exchange relationship with water returning to the middle section of tower H in heat exchanger X; and water from the bottom section of tower F is passed into similar relationship with water returning to the top section of tower H in heat exchanger W. Thus heat is transferred between the top section of tower F and the bottom section of tower H, between the middle sections of towers F and H, respectively, and between the bottom section of tower F and the top section of tower H. The gas total heat-water temperature diagram of this process is similar to that shown in FIG. 4.

The process as described in relation to FIG. 2 is suitable for the case in which it is required to keep the liquids in the humidifying and dehumidifying towers apart from each other, e.g. in a process in which water is contacted with hydrogen for enrichment of the hydrogen in the heavy hydrogen isotope, deuterium. The chemical action in the reactor G may, for example, be a steam/hydrogen chemical exchange process for enrichment of the hydrogen in deuterium as described by Benedict in "Proceedings of the International Conference on the Peaceful Uses of Atomic Energy," volume 8, page 384 (published by the United Nations, 1956).

In a process where it is not required to keep the said liquids apart, however, the process may be modified to dispense with the heat exchangers W, X, Y. In such a process, the pumps N and M transfer water directly from the selected points in tower F to the selected points in tower H; water is fed to the top of tower F from the bottom of tower H by pump L through the heater E (replaced by a steam inlet, as above, if desired); and water is fed to the top of tower H from the bottom of tower F by pump K through cooler Z. In this way, the top section of tower F is connected directly with the bottom section of tower H, the bottom section of tower F is connected directly with the top section of tower H, and the middle sections of the towers are also connected directly.

Another application of the invention is in the condensation of liquid from a gas, followed by re-evaporation of the condensate into the gas under a lower pressure, e.g. in low temperature processes where it is desired to preserve "cold." A typical example is that of hydrogen distillation using ammonia synthesis gas as feed, e.g. to produce hydrogen enriched in deuterium as described by Benedict in the above-mentioned United Nations volume, pages 379 to 384, and by Murphy in "Production of Heavy Water," pages 87–90 (published by the McGraw-Hill Book Co., 1955). This process is illustrated in FIG. 3. The feed gas enters heat exchanger D and then passes successively through heat exchangers C and B, liquid nitrogen being condensed under a pressure of 5–10 atmospheres. Alternatively, the heat exchangers D, C and B may be replaced by a dehumidification tower similar to the tower H described in relation to FIG. 2. A drain pipe V carries this nitrogen to pump R for circulation in tower F. The cold hydrogen passes from heat exchanger B to the reactor G during the course of which it is expanded before being passed up tower F where the nitrogen is re-evaporated. There is, of course, a pressure drop across the reactor G, which in this example consists of a hydrogen distillation plant. Supplementary circulation of the nitrogen as required by the process is achieved by means of pumps P and Q. The gas total heat-liquid nitrogen heat content diagram for this process is similar to that shown in FIG. 4, with water temperature replaced by the product of the specific heat ($C_p$) of liquid nitrogen and the liquid nitrogen temperature, but the operating lines are in this case sandwiched between two saturation curves for the two different pressures, and the sections of the process are arranged to keep thet series of operating lines between the saturation curves.

I claim:
1. In a process in which a gas is subjected to the terminal steps of humidification with a liquid in at least two successive humidifying stages and dehumidification by condensing said liquid therefrom in an equal number of successive dehumidifying stages, and an intermediate step of chemical treatment of the gas, the further step of passing liquid from the first of said humidifying stages into indirect heat exchange relationship with gas passing through the last of said dehumidifying stages and respectively liquid from each succeeding humidifying stage into indirect heat exchange relationship with gas passing through each preceding dehumidifying stage.

2. A process as claimed in claim 1, in which said gas is hydrogen.

3. A process as claimed in claim 2, in which said liquid is water.

4. A process as claimed in claim 2, in which said liquid is liquid nitrogen.

5. A process according to claim 1 wherein the gas is humidified and subjected to chemical treatment prior to being dehumidified.

6. A process according to claim 5 wherein said gas is hydrogen, said liquid is water, and said chemical treatment comprises a process of chemical exchange between the hydrogen and the water in the vapor phase to increase the deuterium content of the hydrogen.

7. A process comprising the steps of dehumidifying a gas by condensing a liquid therefrom in at least two successive dehumidifying stages, subjecting the dehumidified gas to a chemical treatment, subsequently humidifying said gas with said liquid in an equal number of successive humidifying stages, and passing liquid from the first of said humidifying stages into indirect heat exchange relationship with gas passing through the last of said dehumidifying stages and respectively liquid from each succeeding humidifying stage into indirect heat exchange relationship with gas passing through each preceding dehumidifying stage, said humidifying step being carried out at a lower pressure than said dehumidifying step.

8. A process as claimed in claim 7, in which said gas is hydrogen, said liquid is liquid nitrogen, and said chemical treatment comprises a process of distillation to extract hydrogen with an increased deuterium content from said gas.

References Cited in the file of this patent
UNITED STATES PATENTS

| | | |
|---|---|---|
| 1,703,747 | Patart | Feb. 26, 1929 |
| 1,935,675 | Spalding | Nov. 21, 1933 |
| 1,988,759 | Svanoe | Jan. 22, 1935 |
| 2,584,985 | Cicalese | Feb. 12, 1952 |
| 2,809,099 | Baumann | Oct. 8, 1957 |

OTHER REFERENCES

Murphy: Production of Heavy Water, published by McGraw, New York, 1955, pages 87–90 relied on.